Nov. 14, 1967   NOBORU ANDO ETAL   3,352,643
LIQUID CHROMATOGRAPHY AND CHROMATOGRAPHS
Filed Sept. 2, 1964   4 Sheets-Sheet 1
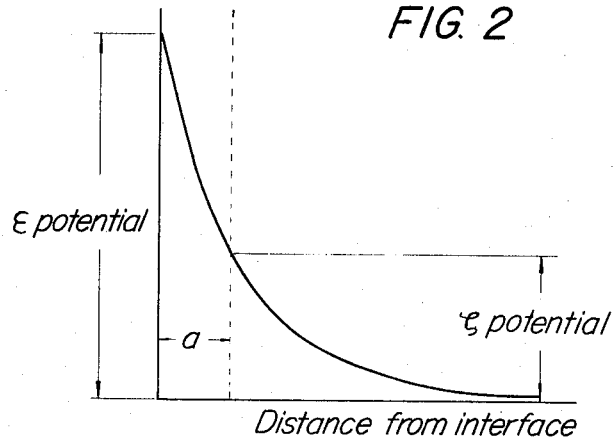
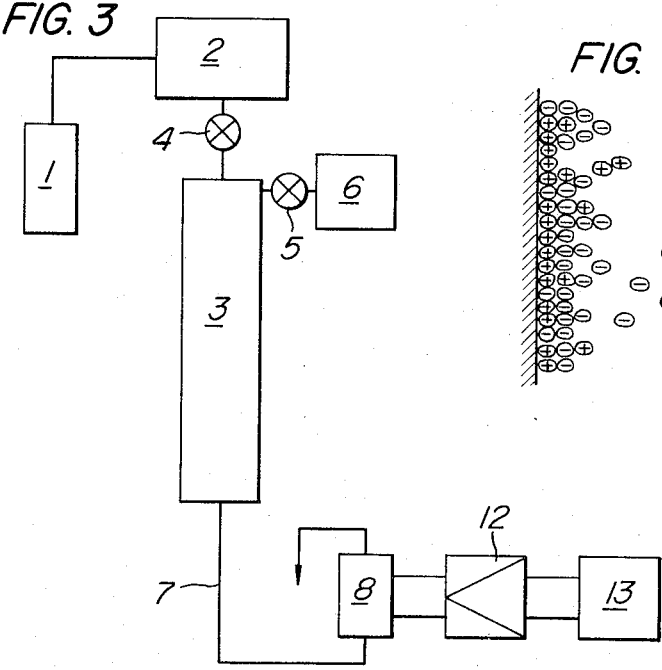
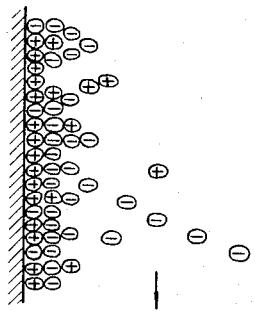
INVENTORS
Noboru Ando
Yoshie Tanizaki
Fumie Hasegawa
BY   Paul M. Craig Jr.
ATTORNEY

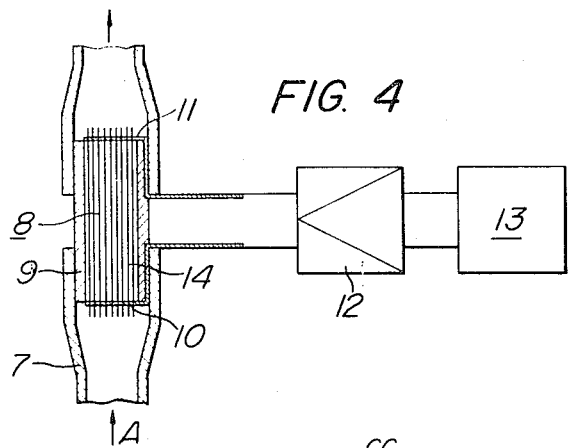
FIG. 4
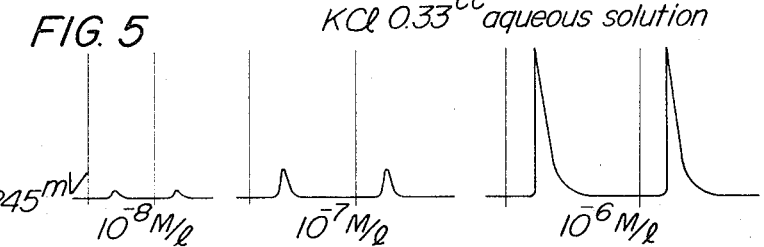
FIG. 5 KCl 0.33$^{cc}$ aqueous solution
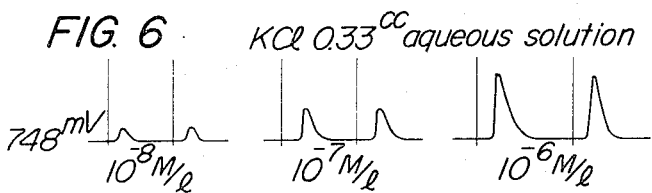
FIG. 6 KCl 0.33$^{cc}$ aqueous solution
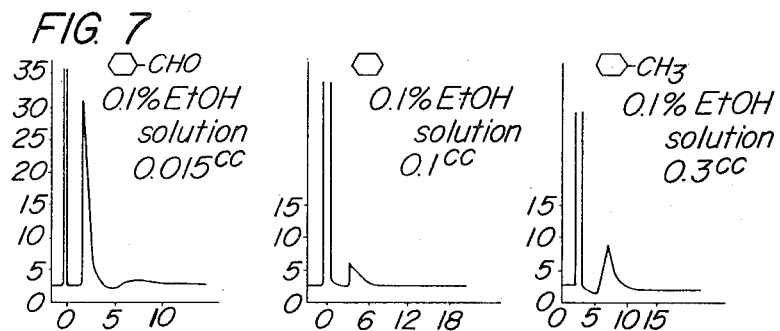
FIG. 7

United States Patent Office 3,352,643
Patented Nov. 14, 1967

3,352,643
LIQUID CHROMATOGRAPHY AND CHROMATOGRAPHS
Noboru Ando, Yoshie Tanizaki, and Fumie Hasegawa, Tokyo, Japan, assignors to Hitachi, Ltd., Tokyo, Japan, a corporation of Japan
Filed Sept. 2, 1964, Ser. No. 394,002
21 Claims. (Cl. 23—230)

ABSTRACT OF THE DISCLOSURE

Process and apparatus for the quantitative and qualitative analysis of a liquid specimen wherein the streaming potential specific to the particular specimen is determined after the variation in flow rate of the carrier liquid as a result of the injection of the specimen into the chromatographic column has become constant. The apparatus comprises a chromatographic column, streaming potential detector means communicating with the lower portion of said column, said detector means having a tubular body containing at least one pair of electrodes which are disposed transversely to the flow of the liquid flowing through the detector means. The detector means can advantageously be provided with a packing material for improving the sensitivity of the detector means.

This invention relates to liquid chromatography and chromatographs and is particularly intended to provide a detection method and device therefor which does not involve any color developing process such as required in conventional detection methods resorting to the photoelectric colorimetry.

In recent years, gas chromatography developments have made remarkable progress and is in wide use. However, it cannot be utilized for analysis of high-boiling organic substances, amino acids, nucleic acids, rare earth elements, etc. Accordingly, there has been a strong demand in every field of art for an automatic liquid chromatography system, that is, for a method and apparatus of detection and quantitative analysis wherein minute amounts of substances in liquid or solution form can be detected with a sensitivity comparable with that of gas chromatography, said detection involving a simple operation and requiring only a limited time for such analysis.

Previous detection methods in liquid chromatography have generally involved photoelectric colorimetry, but any substance which exhibits no absorption over both visible and ultraviolet ranges cannot be detected by such methods. In addition, color development is prerequisite to the methods necessitating conformity of the pH of the solute with that appropriate for color development, and a complicated apparatus is required to carry out such methods. Under these circumstances, no liquid chromatographs have previously had capabilities corresponding to those of gas chromatographs.

The inventor has made various investigations in an attempt to obtain an improved detection method which involves no color developing process, unlike the conventional detection methods which must resort to photoelectric colorimetry, and has found that by measuring the streaming potential of a liquid its qualitative and quantitative analysis can be achieved with success. Further, it has been ascertained experimentally that in liquid chromatography a detection method and apparatus based upon measurement of the streaming potential can be effectively employed to obtain a liquid chromatographic procedure practically comparable with gas chromatography.

Figure 8:
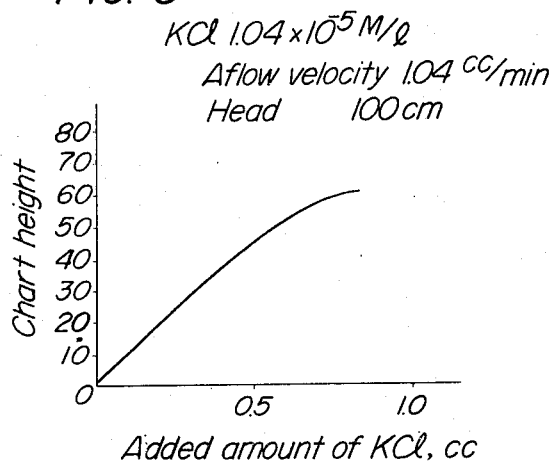
Figure 9:
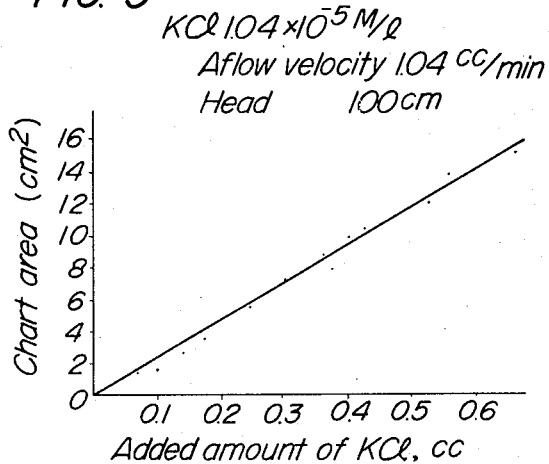
Figure 10:
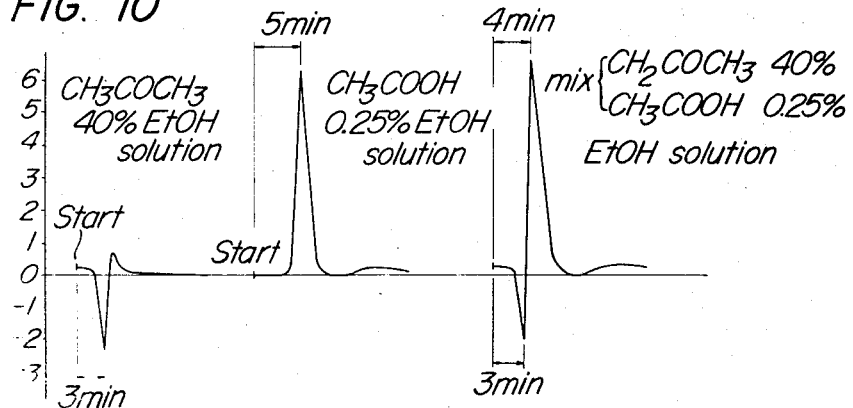
Figure 11:
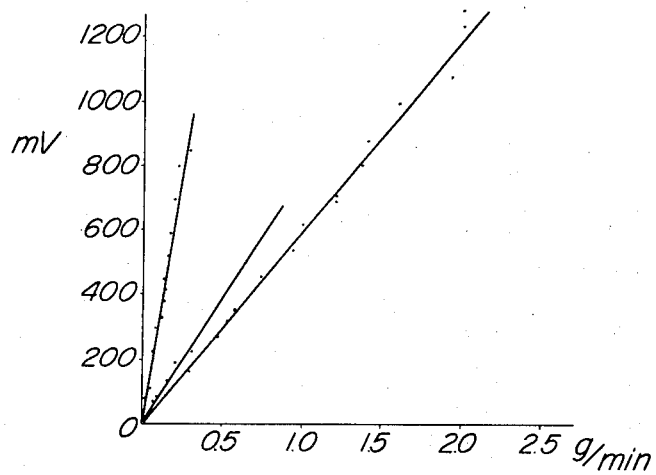
Figure 12:
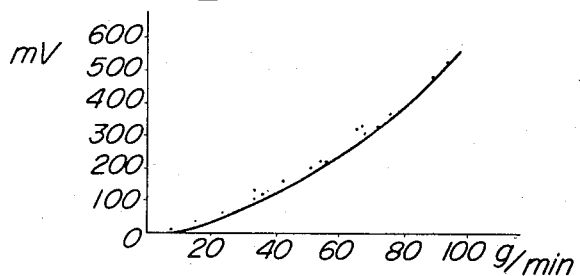

The foregoing and other objects and advantages of the present invention will become apparent from the following description when taken in connection with the accompanying drawings, in which:

FIG. 1 is a schematic diagram illustrating the manner in which a streaming potential induces;
FIG. 2 is a graphical diagram showing a potential curve of the electric double layer;
FIG. 3 is a block diagram illustrating the entire arrangement of an apparatus embodying the present invention;
FIG. 4 is a sectional view of the streaming potential detector;
FIGS. 5 and 6 are diagrams representing the levels of streaming potential as measured with respective aqueous KCl solutions by means of the streaming potential detector;
FIG. 7 is a diagram representing the levels of streaming potential as measured with an organic substance dissolved in ethyl alcohol as solvent;
FIGS. 8 and 9 are diagrams illustrating the relationship of the amount of specimen to the chart height and the chart area, respectively;
FIG. 10 illustrates a chromatogram obtained with the liquid chromatograph according to the invention; and
FIGS. 11 and 12 illustrate the relationship between the flow velocity of carrier liquid and the streaming potential in the presence of a thin or thick stationary phase and in the absence of any such phase, respectively.

Explanation will first be made specifically on the streaming potential of a homogeneous liquid. With a solid and a liquid in contact with each other, a contact potential difference is apparently obtained on the interface and, in the region of bulk solution close to the interface, a non-uniform distribution of ions results in the case where the liquid is an electrolytic solution and polar molecules are oriented in the case of a polar organic liquid containing no ions. In the former case, assuming that the positive ions are sorbed electrostatically, a layer richer in positive ions is formed on the interface and acts electrostatically to attract negative ions remaining in the bulk solution, thus forming an electric double layer. This phenomenon is illustrated schematically in FIG. 1. Under this circumstance, it is assumed that the liquid phase is caused to flow relative to the solid surface in the direction indicated by the arrow. Incidentally, it is supposed that the actual movement of the liquid is not started on the interface but the liquid is moved slowly starting at a certain distance therefrom (as indicated at $a$ in FIG. 2). In this case, since a flow of negative ions in excess is formed, a potential difference takes place in that direction. FIG. 2 represents the potential curve obtained with the ion pattern of FIG. 1. It is to be noted that the potential difference due to flow of the liquid is not based upon the potential $\epsilon$ of the interface but upon the potential $s$ on the surface spaced therefrom by a distance $a$. The relation between the measured streaming potential $E_s$ and potential $s$ is expressed by the well-known Helmholtz formula:

$$E_s = \frac{\Delta p D s}{4\pi \eta \kappa}$$

where $\Delta p$ represents the pressure difference between the two particular points, D represents the dielectric constant of the solvent, $\kappa$ represents the specific conductivity between the electrodes, and $\eta$ the viscosity coefficient. Obviously it follows that a constant streaming potential is obtained by displacing a homogeneous liquid along the interface at a constant velocity, and the potential previously obtained with different inorganic electrolytic solutions on various solid surfaces has ranged from several hundreds millivolts to one thousand and several hundreds millivolts.

The present invention resides in applying to chromatography the phenomenon of streaming potential as recognized in the above and has for its primary object to provide an automatic liquid-chromatographic procedure which includes a detection method relying upon measurement of the streaming potential but not upon the photoelectric colorimetry, to which liquid chromatography has conventionally resorted. Thus, minute amounts of liquid specimen of any kind can be readily detected.

Another object of the present invention is to provide a liquid chromatograph designed to perform the chromatographic procedure described.

A further object of the present invention is to improve the detector sensitivity of automatic liquid chromatography and the chromatograph by arranging within the cell and between the electrodes therein a stationary phase, consisting of a material which is chemically stable, comparatively nonsorptive and electrically high-insulating.

A still further object of the invention is to provide a well-defined accurate chromatogram free from any "trailing" by selecting a stationary phase which is appropriate for the carrier liquid used.

An example of an apparatus embodying the present invention will now be described with reference to FIGS. 3 and 4. Referring first to FIG. 3, reference numeral 1 indicates a pressurizing unit, for example, including a nitrogen bottle and 2 indicates a carrier reservoir holding a carrier liquid such as water. Reference numeral 3 indicates a chromatographic column packed, for example, with an ion exchange resin. The pressurizing unit 1, forming a carrier delivering device, is arranged so that nitrogen gas acts to introduce the water from the carrier reservoir into the top portion of the packed chromatographic column 3 under a definite pressure. The pressurizing unit may alternatively take the form of a constant-pressure minute-delivery pump arranged between the carrier reservoir 2 and the chromatographic column 3 or may simply be replaced by locating the carrier reservoir 2 at a high level appropriate for utilization of the pressure head of the carrier liquid per se. A stop valve 4 is arranged between the top of chromatographic column 3 and the carrier reservoir 2 and another stop valve 5 connects the column top with a specimen feeder device 6. The chromatographic column 3 communicates at the bottom with the conduit 7 and a streaming potential detector 8. The streaming potential detector 8 includes a vertical tubular body 9, which desirably has a diameter not larger than that of conduit 7, and electrodes 10, 11 arranged in the detector tube 9 at its top and bottom transversely across the direction of flow indicated at A. The electrodes are electrically isolated and connected with a direct-current amplifier 12, to the output side of which a recorder 13 is connected.

The tubular body 9 of the streaming potential detector 8 is desirably formed of a nonconducting material for the purpose of insulating the electrodes, which are led to the exterior of the conduit. Among others, glass, polyethylene fluoride or other chemically stable nonconducting materials are preferred for the detector tube 9. Polyester resins are particularly desirable as insulating materials since it can be worked with ease to specific details. The electrodes 10 and 11 are formed of gold, platinum or other chemically stable and nonsorptive metal.

FIGS. 5 to 7 illustrative the results of preliminary experiments conducted with the streaming potential detector usable in the above chromatographic apparatus. FIGS. 5 and 6 illustrate the experimental results obtained with distilled water as a carrier liquid, to which as a specimen 0.33 cc. of aqueous KCl solutions in different concentrations was added. The streaming potential of the carrier liquid was recorded as a reference line. When the specimen was added by operating the stop valves in opposite directions, a signal appeared because of the head difference between the carrier reservoir and the specimen feeder device. In a certain period of time after the signal had dwindled down to the reference line, another signal formed a peak for the specimen. The results of FIG. 5 were obtained under the flow velocity condition selected to form a streaming potential of 245 mv. as the reference line, while FIG. 6 corresponds to the flow velocity condition giving a streaming potential of 748 mv. As clearly observed, the aqueous KCl solutions in concentrations down to $10^{-7}$ M/l. were detected perfectly. This means that even a very minute amount of the specimen KCl solution which corresponds to the gross KCl content of approximately $10^{-11}$ mol can be effectively detected.

The above description has been made in connection with aqueous KCl solutions but it is to be understood that inorganic electrolytes such as NaCl, KI, $Na_2CO_3$, $KMnO_4$, NaAc and RbCl can also be detected with water used as a carrier liquid therefor.

An example of detection with an organic solvent used as a carrier liquid will next be described with reference to FIG. 7. In this example, benzaldehyde, benzene and toluene in a carrier liquid comprising 0.1% ethyl alcohol solution were detected by flowing the solution at a velocity of 21 cc./hr. under a pressure head of 90 cm. It has been found that many other substances, polar and nonpolar, can be detected by the same procedure.

As apparent from the above, the streaming potential detector has advantageous features that it is operable either with water or organic solvent used as a carrier liquid to detect any polar or nonpolar substance and that it can detect minute amounts of liquid specimen of any kind.

In addition, the streaming potential detector used in the present invention is capable of quantitative analysis. In FIGS. 8 and 9, the chart height and the chart area were plotted with respect to the amount of aqueous KCl solution, which had a concentration of $1.04 \times 10^{-5}$ M/l. and was added at a flow velocity of 1.4 cc./min. under a pressure head of 100 cm. As observed, both chart height and chart area exhibited a substantially linear relationship to the added amount of KCl solution.

FIG. 10 illustrates chromatograms obtained with the liquid chromatograph shown in FIGS. 3 and 4. It will be confirmed from FIG. 10 that the same success as obtained experimentally with a streaming potential detector can naturally be expected in the actual liquid chromatography. The chromatograms of FIG. 10 were obtained under the following conditions. Stop valve 4 was opened to introduce ethyl alcohol from the carrier reservoir 2 by means of the pressurizing unit 1 at a constant flow velocity into chromatographic column 3 (of an inner diameter of 6 mm. and a length of 4 cm.) which was packed with magnesolcellite (of 1:5 ratio). Also, stop valve 5 was opened to introduce into the chromatographic column 3 specimen solutions such as 40% ethyl alcohol solution of acetone, 0.25% ethyl alcohol solution of acetic acid, and a mixture of the two solutions. The streaming potential obtained by the streaming potential detector 8 for such carrier liquid and specimen solutions was amplified by direct-current amplifier 12 and recorded on the recorder 13. As apparent from these chromatograms, a chromatograph according to the present invention, which includes a streaming potential detector and is arranged to obtain a flow of carrier liquid at a constant velocity, is capable of rapid quantitative as well as qualitative analysis of any minute amounts of liquid specimen as separated by the chromatographic column without necessitating such complicated processes as color development.

The sensitivity of the streaming potential detector used in the present invention can be further improved by increasing the solid-liquid interface. To this end, a stationary phase is packed between the electrodes which is formed of a chemically stable, less sorptive and highly insulating material. As such material, glass or like material in fine granular form may be employed. Desirably, however, the material is packed so that its surfaces extend parallel to the direction of the electrodes since the streaming potential is actually that component of an electric vector caused by the flow along the interface which is parallel to the direction joining the electrodes. FIG. 4 illustrates one example of such streaming potential detector with glass fiber 14 closely packed in its tubular body 9. By flowing water alone through this streaming potential detector, the relation between the streaming potential in mv. and the flow velocity in g./min. was obtained, as shown in FIGS. 11 and 12. As apparent from FIGS. 11 and 12, the detector sensitivity is increased substantially by use of a stationary phase packed in the detector tube between the electrodes therein and the increase in detector sensitivity is greater as the tube is packed more closely. Further the formation of streaming potential causes a flow of ions in a direction opposite to that in which the carrier liquid flows. The ion flow possibly causes a counter electric current within the detector tube to reduce or nullify the streaming potential. This, however, can readily be prevented either by employing a carrier liquid having a relatively large specific resistance or by controlling the amount of the packaging material so as to increase the velocity of liquid flow.

The signal peak obtained in the chromatogram according to the present invention has at all times a steep rising front, but sometimes it trails noticeably behind depending upon the combination of the kind of packing material and the specimen. This phenomenon can be prevented by selecting for the stationary phase a packing material which is less sorptive and chemically stable against the carrier liquid and the specimen. In general, where an inorganic substance is used as carried liquid, glass fiber or polyethylene fluoride is recommendable as packing material, and where water is used as carrier liquid, polyethylene fluoride or polypropylene fiber is preferable.

What is claimed is:

1. A liquid chromatographic process for the analysis of a liquid sample which comprises introducing a carrier liquid at a constant flow rate into a chromatographic column and through a streaming potential detector which communicates with the lower portion of said columns, measuring the streaming potential of the carrier liquid at said constant flow rate, adding a specific amount of a liquid sample to the upper portion of said column, and analyzing said liquid sample by measuring the streaming potential specific to said sample after the variation in flow rate of said carrier liquid resulting from the addition of said liquid sample has become constant.

2. The process of claim 1, wherein the chromatographic column is packed with an ion exchange resin.

3. The process of claim 1, wherein a packing material is provided in the streaming potential detector, said material being chemically stable, relatively nonsorptive and electrically high-insulating.

4. The process of claim 3, wherein the packing material is in finely divided form and is selected from the group consisting of glass, polyethylene fluoride and polypropylene.

5. The process of claim 3, wherein the packaging material is in fibrous form with surfaces which extend parallel to the direction of flow, said fibrous material being selected from the group consisting of glass, polyethylene fluoride and polypropylene.

6. The process of claim 1, wherein the carrier liquid is water and the liquid sample is an inorganic aqueous solution.

7. The process of claim 6, wherein the inorganic aqueous solution is selected from the group consisting of potassium chloride, sodium chloride, rubidium chloride, potassium iodide, sodium carbonate, potassium permanganate, and sodium acetate.

8. The process of claim 1, wherein the carrier liquid is an organic solvent and the liquid sample is an organic solution.

9. The process of claim 8, wherein the organic solvent is ethyl alcohol and the organic solution is selected from the group consisting of benzaldehyde, benzene and toluene.

10. A liquid chromatographic apparatus for the analysis of a liquid sample which comprises a chromatographic column, means for introducing a carrier liquid under pressure to the upper portion of said column, means for introducing a liquid sample to the upper portion of said column, streaming potential detector means communicating with the lower portion of said column, said detector means having a tubular body formed of a non-conductive and chemically stable material, said tubular body containing at least one pair of electrodes separated from each other and disposed transversely to the flow of the liquid flowing through the detector means.

11. The apparatus of claim 10, wherein the electrodes are electrically isolated and connected with a direct current amplifier, the output side of which is connected with a recorder means.

12. The apparatus of claim 10, wherein conduit means provide the communicating means between the chromatographic column and the streaming potential detector means, a tubular body of said detector means having a diameter not larger than said conduit means.

13. The apparatus of claim 10, wherein the tubular body is formed of a non-conductive material selected from the group consisting of glass, polyethylene fluoride, and polyester resins.

14. The apparatus of claim 10, wherein the electrodes are made of a chemically stable nonsorptive metal.

15. The apparatus of claim 14, wherein the metal is selected from the group consisting of gold and platinum.

16. The apparatus of claim 10, wherein the carrier liquid is disposed in a carrier reservoir which is associated with a perssure-producing means upstream of said reservoir.

17. The apparatus of claim 10, wherein the carrier liquid is disposed in a carrier reservoir and a constant-pressure pump is arranged between the carrier reservoir and the chromatographic column.

18. The apparatus of claim 10, wherein a packing material in granular form and composed of a chemically stable, nonsorptive insulating material is packed between the electrodes in the tubular body.

19. The apparatus of claim 10, wherein a packing material composed of a chemically stable nonsorptive insulating material in fibrous form and oriented in the direction of flow of the liquid through the tubular body is packed between the electrodes in said tubular body.

20. The apparatus of claim 18, wherein the packing material is selected from the group consisting of glass, polyethylene fluoride and polypropylene.

21. The apparatus of claim 17, wherein the packing material is selected from the group consisting of glass fibers, polyethylene fluoride, and polypropylene fibers.

References Cited

UNITED STATES PATENTS

| | | | |
|---|---|---|---|
| 2,492,493 | 12/1949 | Misson | 324—71 |
| 2,569,625 | 10/1951 | Wyllie | 73—61.4 |
| 3,074,784 | 1/1963 | Ferrari | 23—253 |

OTHER REFERENCES

Lederer et al., "Chromatography," 1957, page 116.

JOSEPH SCOVRONEK, *Acting Primary Examiner.*

MORRIS O. WOLK, *Examiner.*

R. E. SERWIN, *Assistant Examiner.*